W. RAUTENSTRAUCH.
DRIVING MECHANISM FOR MOTOR VEHICLES.
APPLICATION FILED AUG. 15, 1916.

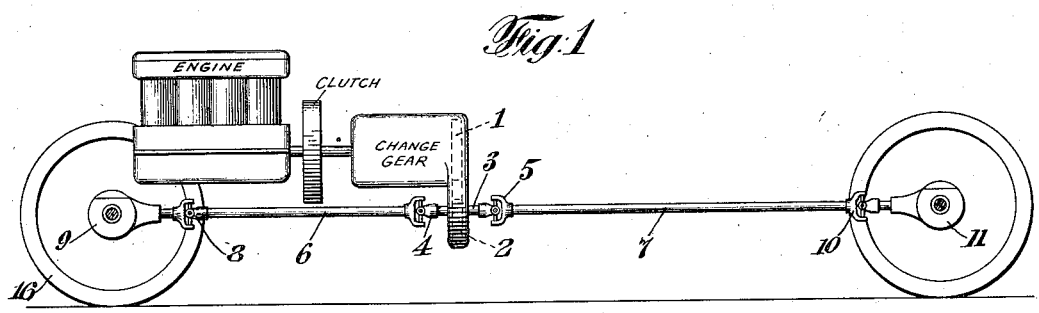
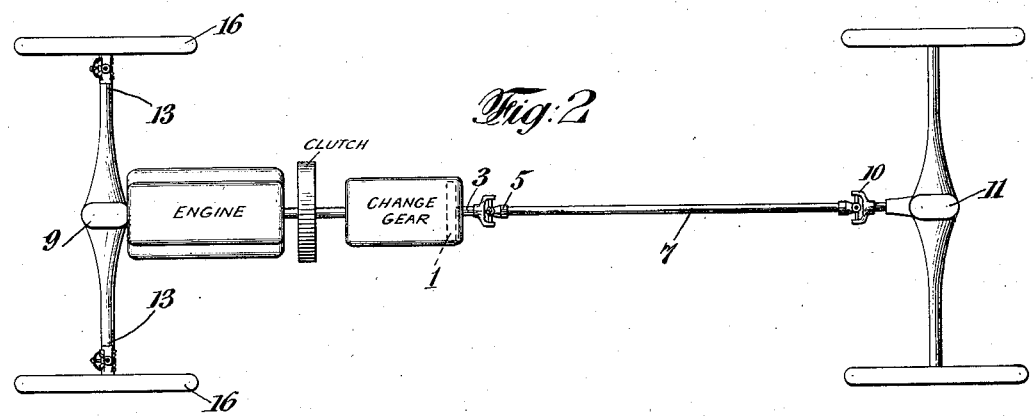
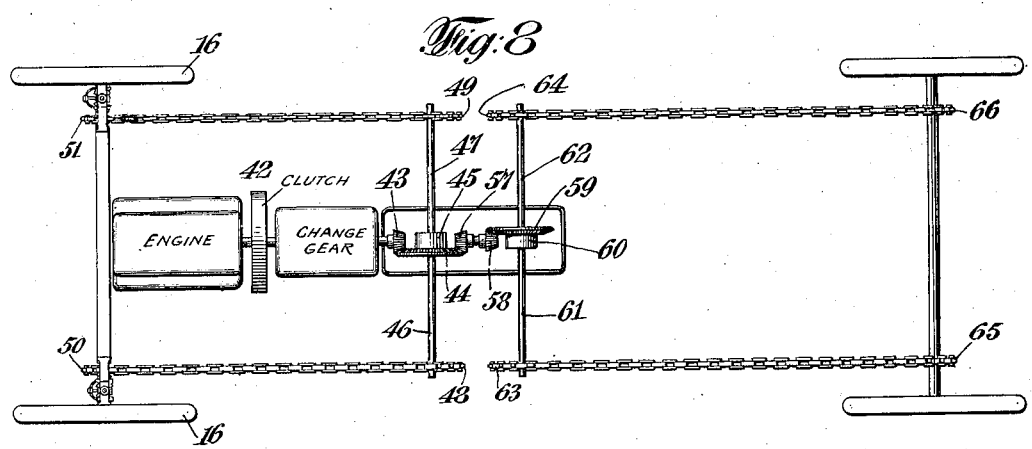

1,295,793.

Patented Feb. 25, 1919.
4 SHEETS—SHEET 2.

Inventor
Walter Rautenstrauch,
By his Attorneys
Prindle Wright & Small.

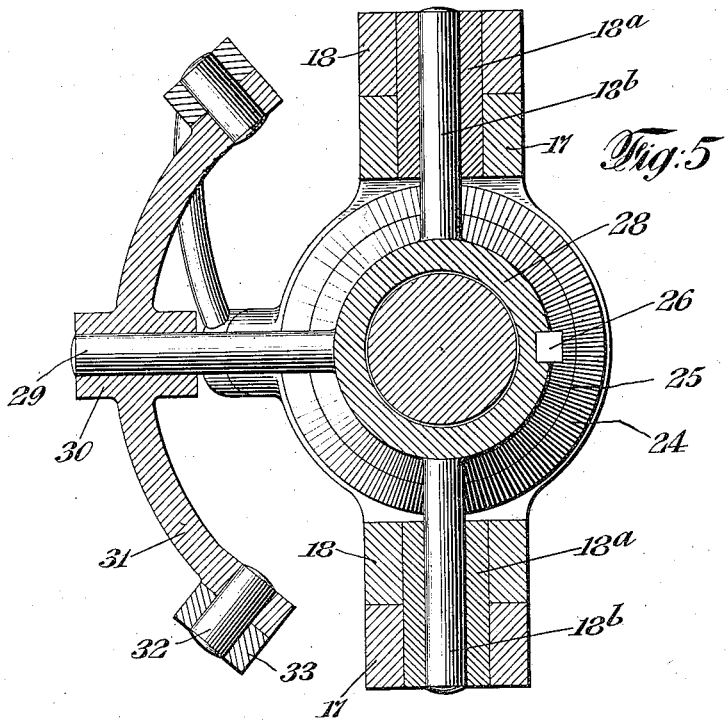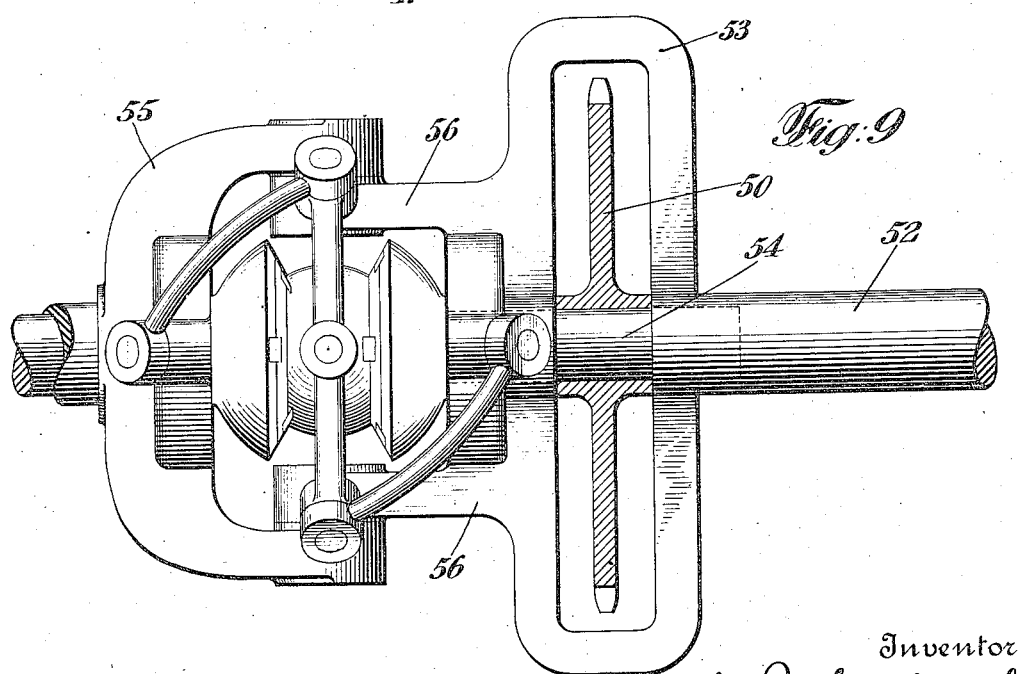

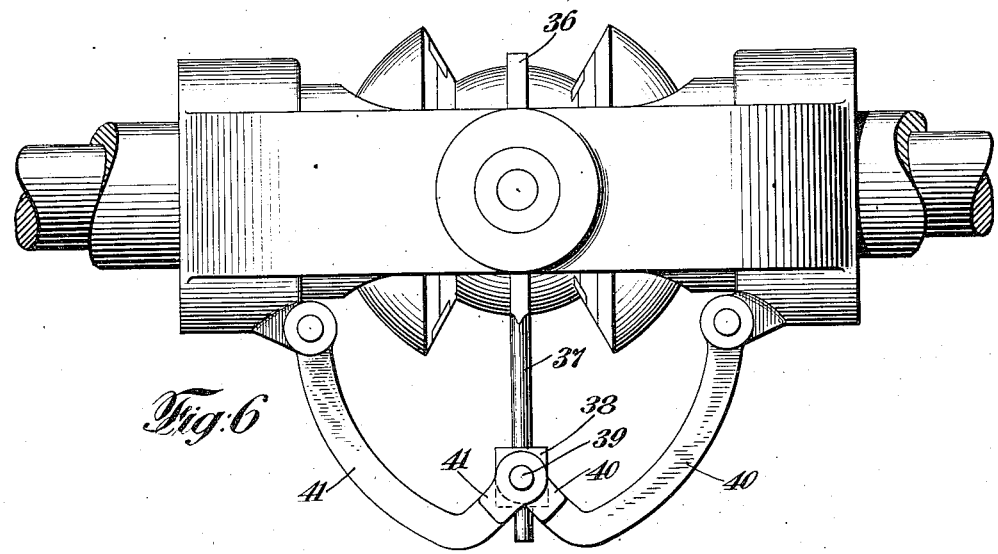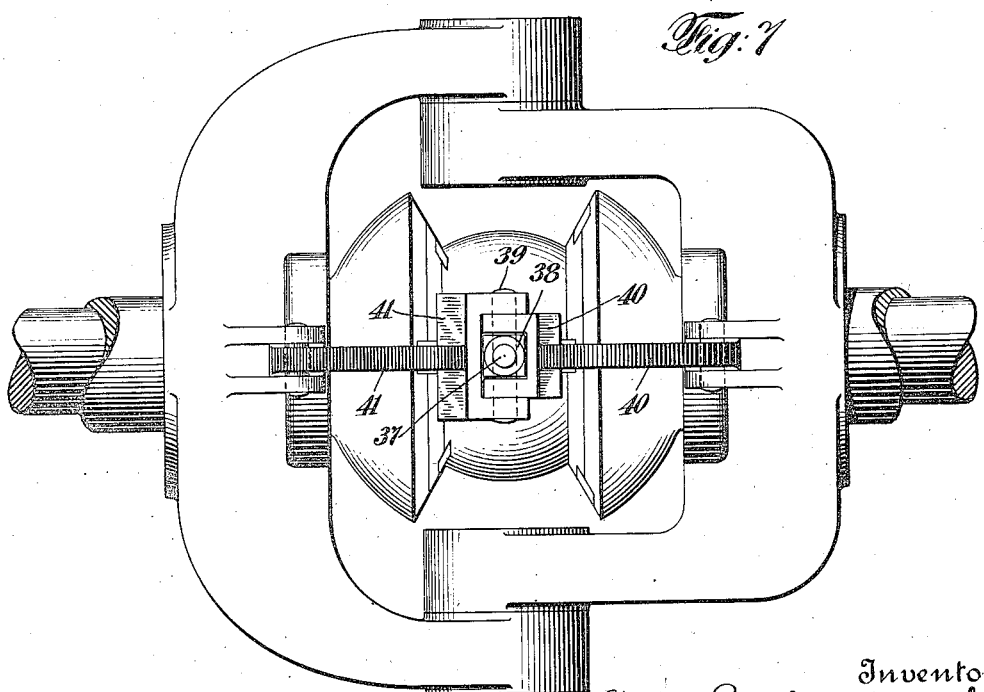

UNITED STATES PATENT OFFICE.

WALTER RAUTENSTRAUCH, OF PALISADE, NEW JERSEY.

DRIVING MECHANISM FOR MOTOR-VEHICLES.

1,295,793. Specification of Letters Patent. Patented Feb. 25, 1919.

Application filed August 15, 1916. Serial No. 114,943.

*To all whom it may concern:*

Be it known that I, WALTER RAUTENSTRAUCH, of Palisade, in the county of Bergen, and in the State of New Jersey, have invented a certain new and useful Improvement in Driving Mechanism for Motor-Vehicles, and do hereby declare that the following is a full, clear, and exact description thereof.

The object of my invention has been to provide a driving gear for motor-driven vehicles, such as automobile pleasure cars, trucks, tractors, vehicles, and machinery of a similar nature, by which all the wheels of such a vehicle may be driven efficiently and steered by the usual steering mechanism, and to such ends my invention consists in the driving gear for motor-driven vehicles hereinafter specified.

In the accompanying drawings—

Figure 1 is a diagrammatic, vertical, longitudinal, sectional view of an automobile embodying my invention, the driving gear being of the spur gear type;

Fig. 2 is a diagrammatic, plan view of Fig. 1;

Figs. 3, 4 and 5 are, respectively, a side elevation, a plan view, and a vertical, sectional view of a combined knuckle-joint and transmission gearing indicated in Fig. 1;

Figs. 6 and 7 are, respectively, a side elevation and a plan view of another form of knuckle joint and transmission gearing;

Fig. 8 is a diagrammatic, plan view of an automobile having sprocket gear-driving mechanism, embodying my invention; and, Fig. 9 is an elevation partly in section showing a detail of the knuckle joint and accompanying parts of Fig. 8, arranged for sprocket driving.

Figure 3:
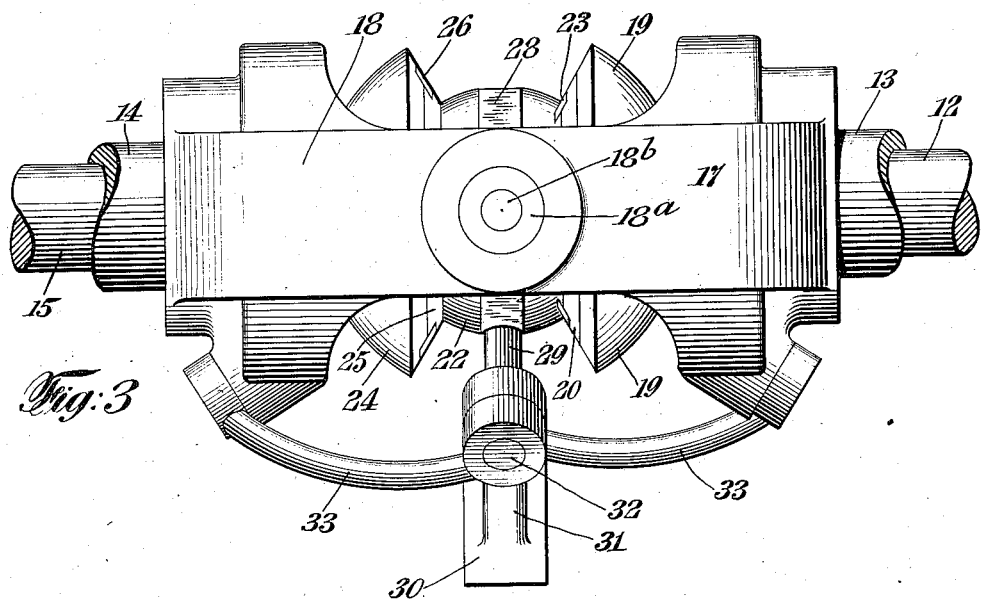

In the drawings, I have illustrated embodiments of my invention which are the best embodiments known to me for their particular purposes, but my invention is capable of embodiment in many different forms, and it is not to be regarded as restricted to the forms illustrated, as they are to be taken as typical only.

In the form of my invention illustrated in Figs. 1 to 5, I have illustrated the application of my invention to a spur gear-driven automobile or truck, the parts whose details are not changed by my invention being indicated diagrammatically, and the frame and carriage body being omitted for the sake of clearness. In the said embodiment, the engine is connected with the change-gears through the clutch, as usual. A gear 1 is driven by the change-gears and meshes with the gear 2 on the shaft 3, which is connected by Hooke's joints 4 and 5, respectively, with driving shafts 6 and 7 running to the forward and rear axles, respectively. The shaft 6 is connected by a Hooke's joint 8 with a differential 9 on the front axle, and the shaft 7 is connected by a Hooke's joint 10 with the differential 11 on the rear axle, these differentials driving live axles within the axle boxes. The rear wheels are placed directly on their respective live axles as usual. The front axle comprises two main axle sections which are driven by the differential 9 and two outer axle sections jointed to the main axle sections, the outer axle sections being mounted in bearings in the usual "knuckle" joints at each end of the axle casing, close up to the wheels, and the vehicle is steered by turning the front wheels by means of these "knuckle" joints. I desire to so drive the two outer sections of the front axle that they shall always be in "phase-relation" with their respective main axle sections in all angular relations of said sections; that is, that the outer axle section shall always turn through exactly the same number of degrees (no more and no less) as its corresponding main axle section. In the embodiment shown in Figs. 1 to 5, I accomplish this as follows:

The main axle sections 12 which are connected with the differential gearing, are journaled in axle casings 13, which latter will usually be secured to the springs of the vehicle. Each axle casing 13 is connected with an axle bearing 14, carrying a stub axle 15 upon which is mounterd one of the front road wheels 16. The axle casings 13 and 14 are connected by what is known as a "knuckle joint", so that the vehicle can be steered by turning the wheels and the short axles on which they are carried, without turning the main sections. To accomplish this, the axle casing 13 is provided with a knuckle section 17, and the axle casing 14 is provided with an axle section 18. These sections, in the present instance, are double or yoke form, and are hinged together by vertical pivot pins 18ᵃ. The knuckle section 18 is swung in a horizontal plane by the usual steering gear (not illustrated). In order, as before stated, to drive the wheel in the same phase-relation as its axle section 12, I provide the following construction: Such axle section carries a spherical cup or member 19, which receives and is splined to a similar member 20 by a sliding or feather key 21, and the cup 20 fits upon a ball 22 and is splined to the said ball by a similar key 23, which extends in a plane perpendicular to that of the key 21, when said planes pass through the axis of the axle 12. Similarly, the short axle section 15 carries a spherical cup 24 fitting upon a similar cup 25, the two being connected by a key 26, and the cup 25 fits upon the ball 22 and is splined to the said ball by a key 27. The keys 23 and 27 are in planes perpendicular to each other. The ball 22 is held in a ring 28, which may be received in an equatorial groove in the said ball, and the said ring carries a pin 29 that as illustrated, is journaled in a bearing 30 at the middle of a link 31, whose ends carry pins 32 by which the said link is pivoted to links 33, that in turn are pivoted upon pins 34 and 35 carried upon the respective knuckle yokes 17 and 18. In this embodiment of my invention the pivot pins 18$^b$ for the knuckles are also attached to the ring 28 which, though a desirable construction, is not an absolutely necessary one.

The described construction transmits motion from the main axle sections 12 to the short axle sections 15, notwithstanding that such sections are compelled to assume varying angles to each other in steering a vehicle. If, however, the amount of rotation transmitted were in any way influenced by the turning of the knuckle in steering, the effect would be harmful since the wheel, in some phases of its rotation, would turn faster or slower than in other phases, with the consequence that the wheel could not keep in phase with the rear wheels, and would have to slip either forward or backward, causing a ruinous wear upon its tire. The pin 29 being connected with the link 31 at its middle, and the opposite ends of that link being connected with the yokes by the links 33, which are of equal length, the latter links will always stand at equal angles to the link 31 when the axles are moved relative to each other, with the result that the pin 29 connected with the ring or yoke 28 about the ball, will always bisect the angle formed by the axles. By thus providing means by which the pin 29 on the ring or yoke 28 of the ball always bisects the angle formed by the two axle sections, this unity of phase relation is always maintained regardless of the angle at which the axles may be, due to the exigencies of steering. In effect, I provide a double universal joint connection in which the single universal joints are maintained at right angles to each other, and compensate for each other in every phase of rotation, so that the tendency of one to vary the speed delivered from unity is counterbalanced by the equal, but opposite, tendency of the other.

Figure 4:
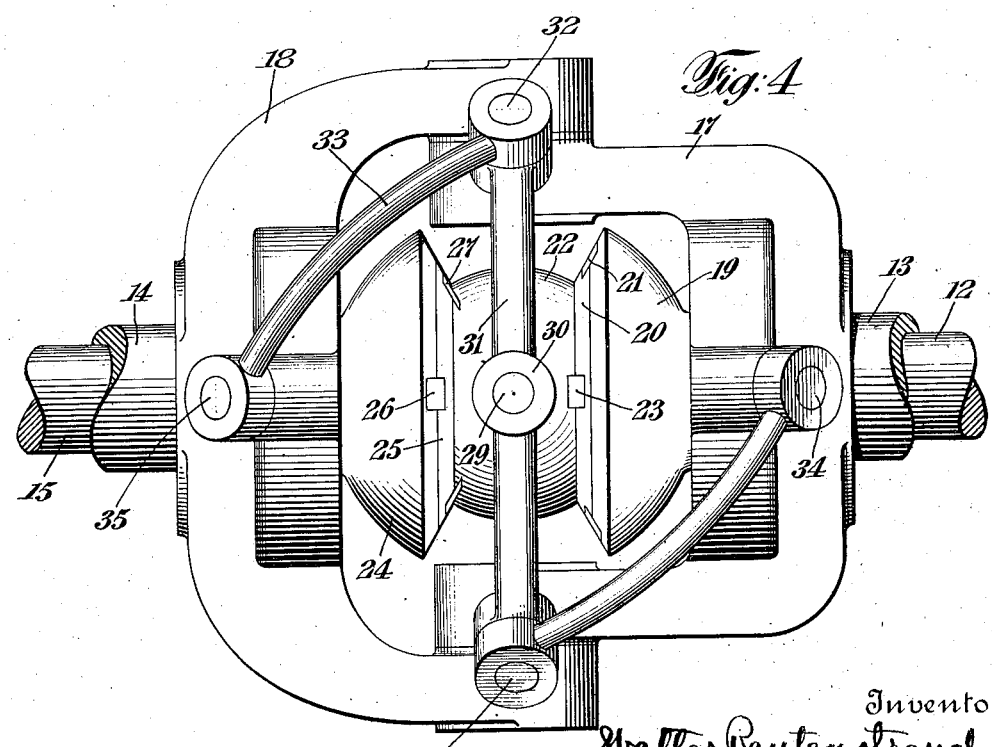

The form of mechanism shown in Fig. 7 is similar in principle to that shown in Figs. 3, 4 and 5, except that the pins 18$^a$ are not connected with the ring or yoke 36 embracing the ball, and the pin 37, corresponding to the pin 29, is provided with a slide 38 having upper and lower pivot pins 39 upon which are pivoted yoked links 40 and 41, respectively, which, at their opposite ends, are pivoted to the axle casings. These links being of equal length, always so position the slide 38 that the pin 37 bisects the angle formed by the axles, as in the case of the construction shown in Figs. 3, 4 and 5.

In Fig. 8 I have illustrated the application of my invention to a sprocket-gear driven automobile. The motor and change-gear mechanism 42 transmit motion through a pinion 43 and gear 44 to a "differential" 45, whose shafts 46 and 47, respectively, carry sprocket-gears 48 and 49 from which sprocket chains run to sprocket-gears 50 and 51, which drive the front road wheels.

For driving the rear axle, a pinion 57 is driven by the gear 44, and the shaft of said pinion carries a pinion 58 which meshes with a bevel gear 59 that drives a "differential" 60, which latter drives shaft sections 61 and 62. These shaft sections, respectively, carry sprocket-gears 63 and 64, which are geared to similar gears 65 and 66 on rear axle sections carrying the rear wheels.

As illustrated in Fig. 9, the main front dead axle 52 carries a yoke 53 at each end, in which the sprocket-gear 50 or 51 is mounted on a short live axle 54. The movable member or yoke is pivoted to arms 56 on the yoke 53. This movable member and its axle and wheels are constructed as shown in Figs. 3, 4, and 5, and the same gearing may be used for transmitting motion from the axle 54 to the road wheel.

My invention has, among others, the following advantages;

All four wheels of the motor vehicle are driven by the motor, and none of them is an idler. This driving of all the wheels gives greater tractive effort per unit weight of machine, because all of the weight rests on the driving wheels and none of it on idler wheels.

In going over soft ground in which one or both of the ordinarily driven wheels might slip, a motor vehicle provided with my invention has the advantage of the gripping of all the wheels on the ground, so that the vehicle is much more likely to be able to propel itself than in case only two of the wheels were driven.

My invention distributes the strain due to the driving among all the tires of the vehicle, instead of causing it all to take place on two tires only, and this greatly lengthens the life of the tires, and will probably reduce the total cost of such wear.

A motor vehicle in which only two wheels are driven can grip the ground only at one point longitudinally of the road, while my invention, by driving all the wheels, provides for gripping over a greater length of the road, so that if either pair of wheels is unable to obtain a grip sufficient to drive the car, the other pair may be upon more solid ground and so may be able to propel the vehicle. Thus, by the use of my invention, there is double the chance of securing a grip and propelling the vehicle than with the ordinary vehicle.

In the form of my invention illustrated in Fig. 8, no one wheel can slip unless two others slip with it. Therefore, the slipping of any wheel is rendered much less likely. The tractive effort of a wheel is greatly lessened when it slips.

I claim:

1. In a motor vehicle, the combination of front wheel axles each comprising axle sections capable of being swung relative to each other to permit steering and a double universal joint device adapted to transmit motion from one to the other of said sections of each of said axles, and means for maintaining the separate units of the said double universal joint devices 90° from each other.

2. In a motor driven vehicle, the combination of main axle sections, a differential connecting them, wheel axle sections mounted for movement to permit steering, wheels carried thereby, and means so connecting the main axle sections with the wheel axle sections that said sections shall always be in true phase relation with regard to the wheel axle sections.

3. In a motor vehicle, the combination of a main axle section, a wheel axle section, mountings therefor permitting angular movement relative to each other, and a connection between said axle sections, said connection comprising a ball having cups on opposite sides that are splined to said ball by keys, which are perpendicular to each other, cups on said axle sections engaging said first mentioned cups by keys which are perpendicular to the adjacent keys on the ball, and means for maintaining the axes on which the outer cups rotate at equal angles to the axis on which the ball rotates.

4. In a motor vehicle, the combination of a main axle section, a wheel axle section, mountings therefor permitting angular movement relative to each other, and a connection between said axle sections, said connection comprising a ball having cups on opposite sides that are splined to said ball by keys, which are perpendicular to each other, cups on said axle sections engaging said first mentioned cups by keys which are perpendicular to the adjacent keys on the ball, and means for so positioning the said ball that it shall rotate upon an axis in planes passing through both of said keys and for maintaining said axis at equal angles to said axle sections.

5. In a motor vehicle, the combination of a main axle section, a wheel axle section, mountings therefor permitting angular movement relative to each other, and a connection between said axle sections, said connection comprising a ball having cups on opposite sides that are splined to said ball by equatorial keys, said keys being perpendicular to each other, cups on said axle sections engaging said first mentioned cups by keys which are perpendicular to the adjacent keys on the ball, and means for maintaining the axes on which the outer cups rotate at equal angles to the axis on which the ball rotates.

6. In a motor vehicle, the combination of a main axle section, a wheel axle section, mountings therefor permitting angular movement relative to each other, and a connection between said axle sections, said connection comprising a ball having cups on opposite sides that are splined to said ball by equatorial keys, said keys being perpendicular to each other, cups on said axle sections engaging said first mentioned cups by keys which are perpendicular to the adjacent keys on the ball, and means for so positioning the said ball that it shall rotate upon an axis in planes passing through both of said keys and for maintaining said axis at equal angles to said axle sections.

7. In a motor vehicle, the combination of a main axle section, a wheel axle section, mountings therefor permitting angular movement relative to each other, and a connection between said axle sections, said connection comprising a ball having cups on opposite sides that are keyed to said ball by keys which are perpendicular to each other, cups on said axle sections engaging said first mentioned cups by keys which are perpendicular to the adjacent keys on the ball, and means for maintaining the axes on which the outer cups rotate at equal angles to the axis on which the ball rotates.

8. In a motor vehicle, the combination of a main axle section, a wheel axle section, mountings therefor permitting angular movement relative to each other, and a connection between said axle sections, said connection comprising a ball having cups on opposite sides that are splined to said ball by keys, which are perpendicular to each other, cups on said axle sections engaging said first mentioned cups by keys which are perpendicular to the adjacent keys on the ball, and means for so positioning the said ball that it shall rotate upon an axis in planes passing through both of said keys and for maintaining said axis at equal angles to said axle sections, the keys engaging said cups on said axle sections being in planes passing through the axes of said sections.

9. In a motor vehicle, the combination of a main axle section, a wheel axle section, mountings therefor permitting angular movement relative to each other, and a connection between said axle sections, said connection comprising a ball having cups on opposite sides that are splined to said ball by equatorial keys, said keys being perpendicular to each other, cups on said axle sections engaging said first mentioned cups by keys which are perpendicular to the adjacent keys on the ball, and means for maintaining the axes on which the outer cups rotate at equal angles to the axis on which the ball rotates.

10. In a motor vehicle, the combination of a main axle section, a wheel axle section, mountings therefor permitting angular movement relative to each other, and a connection between said axle sections, said connection comprising a ball having cups on opposite sides that are keyed to said ball by equatorial keys, said keys being perpendicular to each other, cups on said axle sections engaging said first mentioned cups by keys which are perpendicular to the adjacent keys on the ball, and means for so positioning the said ball that it shall rotate upon an axis in planes passing through both of said keys and for maintaining said axis at equal angles to said axle sections, the keys engaging said cups on said axle sections being in planes passing through the axes of said sections.

11. In a motor vehicle, the combination of a main axle section, a wheel axle section, mountings therefor permitting angular movement relative to each other, and a connection between said axle sections, said connection comprising a ball having cups on opposite sides that are splined to said ball by keys which are perpendicular to each other, cups on said axle sections engaging said first mentioned cups by keys which are perpendicular to the adjacent keys on the ball, a ring or yoke engaging said ball in a plane perpendicular to the planes of said keys on said ball, and means for maintaining said ring or yoke at equal angles to said axle sections.

12. In a motor vehicle, the combination of a main axle section, a wheel axle section, mountings therefor, permitting angular movement relative to each other, and a connection between said axle sections, said connection comprising a ball having cups on opposite sides that are splined to said ball by keys, which are perpendicular to each other, cups on said axle sections engaging said first mentioned cups by keys which are perpendicular to the adjacent keys on the ball, a ring or yoke engaging said ball in a plane perpendicular to the planes of said keys on said ball, and means for maintaining said ring or yoke at equal angles to said axle sections, said means comprising links of equal length engaging said ring or yoke and pivoted to said axle sections.

13. In a motor vehicle, the combination of a main axle section, a wheel axle section, mountings therefor permitting angular movement relative to each other, and a connection between said axle sections, said connection comprising a ball having cups on opposite sides that are splined to said ball by keys, which are perpendicular to each other, cups on said axle sections engaging said first mentioned cups by keys which are perpendicular to the adjacent keys on the ball, a ring or yoke engaging said ball in a plane perpendicular to the planes of said keys on said ball, and means for maintaining said ring or yoke at equal angles to said axle sections, said means comprising a link pivoted at its middle to said ring or yoke, and links of equal length pivoted to the ends of said first mentioned link and, respectively, to said axle sections.

14. In a motor driven vehicle, the combination of a stationary axle section, a bearing therefor, a movable axle section, a bearing therefor, a knuckle joint connecting said bearings, spherical cups carried by said axle sections, a ball carried by a ring or yoke having vertical pins extending through the axis of said knuckle joint, spherical cups interposed between said first mentioned cups and said ball, keys engaging the members of each pair of spherical cups with each other, said keys being at right angles to each other, keys engaging each of said inner spherical cups with said ball, said latter mentioned keys being at right angles to each other, and also at right angles to their respective first mentioned keys, a horizontally extended pin connected with said ring or yoke, and means for maintaining said pin at equal angles with said axle sections.

15. In a motor driven vehicle, the combination of a stationary axle section, a bearing therefor, a movable axle section, a bearing therefor, a knuckle joint connecting said bearing, spherical cups carried by said axle sections, a ball carried by a ring or yoke having vertical pins extending along the axis of said knuckle joint, spherical cups interposed between said first mentioned cups and said ball, keys engaging the members of each pair of spherical cups with each other, said keys being at right angles to each other, keys engaging each of said inner spherical cups with said ball, said latter mentioned keys being at right angles to each other, and also at right angles to their respective first mentioned keys, a horizontally extending pin connected with said ring or yoke, and means for maintaining said pin at equal angles with said axle sections, said means comprising links of equal length pivoted to said axle sections, and engaging said pin on said ring or yoke.

16. In a motor driven vehicle, the combination of a stationary axle section, a bearing therefor, a movable axle section, a bearing therefor, a knuckle joint connecting said bearings, spherical cups carried by said axle sections, a ball carried by a ring or yoke having vertical pins extending along the axis of said knuckle joint, spherical cups interposed between said first mentioned cups and said ball, keys engaging the members of each pair of spherical cups with each other, said keys being at right angles to each other, keys engaging each of said inner spherical cups with said ball, said latter mentioned keys being at right angles to each other and also at right angles to their respective first mentioned keys, a horizontally extended pin connected with said ring or yoke, means for maintaining said pin at equal angles with said axle sections, comprising links of equal length pivoted to said axle sections, and a link pivoted midway its ends to said pin on said ring or yoke, and pivoted at its ends to such first mentioned yokes.

17. In a motor driven vehicle, a single driving shaft, two main axle sections, a differential between said driving shaft and each of said axle sections, wheel axle sections, said wheel axle sections being mounted for movement to permit steering, and means so connecting the corresponding main axle sections therewith, that said wheel axle sections shall always be in phase with each other.

18. In a motor driven vehicle, the combination of two pairs of wheels, a driving shaft, a differential interposed between the shaft and each of said pairs of wheels, one of said pairs of wheels being mounted to permit steering, and having a motion transmitting device effective to maintain constant angular speed of the wheels of said pair.

19. In a motor driven vehicle, a combination of four wheels, separate stationary axle sections for each of said wheels, differentials connecting each pair of axle sections, a shaft extending lengthwise of the vehicle connecting said differentials, pivoted axle sections for one pair of wheels to permit steering, and means for transmitting power to said pivoted axle sections, said means being effective to maintain constant angular speed of the wheels of said pair.

In testimony that I claim the foregoing I have hereunto set my hand.

WALTER RAUTENSTRAUCH.

Witness:
    EDWIN J. PRINDLE.